United States Patent Office 3,258,438
Patented June 28, 1966

3,258,438
ADDITION POLYMER COMPOSITIONS AND
METHODS OF PRODUCING THEM
Robert S. Shaw, Philadelphia, and John A. Dupont, North Hills, Pa., assignors to Rohm & Haas Company, Philadelphia, Pa., a corporation of Delaware
No Drawing. Filed May 1, 1962, Ser. No. 191,637
10 Claims. (Cl. 260—22)

The present invention is concerned with addition polymer compositions that are particularly adapted for use as coating and impregnating compositions. It is particularly concerned with the production in a hydrocarbon medium of an addition polymer in the form of finely divided particles which are insoluble in the medium but dispersed therein in a condition of stability, especially against a mechanical action.

Known compositions for coating and impregnating purposes include solutions of addition polymers in organic solvents or water and aqueous latices. Organic solvent solutions generally contain a polymer of low molecular weight which tends to provide properties of brittleness and lack of durability of coatings obtained in comparison to the properties obtainable with higher molecular weight polymers. When the polymers to be used in such solutions are made of moderate molecular weight, the solutions become extremely viscous and are difficult to apply. When such solutions are applied at customary concentrations such as in spraying, the coatings are frequently so thin that it may be necessary to make more than two applications to provide adequate thickness. Solvent solutions often require expensive solvents such as esters, ketones, and hydrocarbons of essentially aromatic character, and such solvents are often severely toxic.

In many cases aqueous solutions are simply out of the question because the nature of the polymer, to be soluble in water, must necessarily impart water-sensitivity to the coated or impregnated product. Of course, aqueous solutions also necessitate the use of polymers of relatively low viscosity and the disadvantages pointed out hereinabove in conjunction with the application of high viscosity solutions of relatively lower concentration which produce coatings of inadequate thickness in a single pass.

Use of emulsion polymers or aqueous latices of the polymer enable the application of polymers of high molecular weight. However, they have the disadvantage that it is impossible to incorporate in the polymers various monomers which are reactive toward water such as maleic anhydride, itaconic anhydride, methacrylic anhydride and isocyanato-ethyl acrylate. Furthermore the water has a high latent heat of evaporation and hence more heat is required for drying. This factor may be of the order of ten times in aqueous systems, as compared to aliphatic hydrocarbon systems. The application of aqueous systems over unprimed wood also often brings about undesirable effects, such as raising the grain which in turn produces a non-uniform finish. Light-weight fibrous materials such as extremely thin tissue or paper cannot be impregnated with an aqueous system because of disintegration.

It is an object of the present invention to provide a dispersion of an addition polymer in the form of fine particles insoluble in an aliphatic hydrocarbon whereby the disadvantages of organic solvent solutions and aqueous compositions heretofore used for coating and impregnating purposes have been greatly reduced or completely overcome. Other objects and advantages of the invention will be apparent from the description thereof hereinafter.

In accordance with the present invention new and improved essentially non-aqueous or anhydrous compositions are produced by addiiton-polymerizing at least one monoethylenically unsaturated monomer having a group

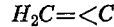
$$H_2C=<C$$

in a hydrocarbon medium consisting essentially of one or more aliphatic hydrocarbons containing dissolved therein a material selected from the group consisting of (A) a mixture of (1) a drying oil-modified polyester and (2) an oil-soluble acrylic ester polymer, and (B) a polar monomer-modified mixture of (1) a drying oil-modified polyester and (2) an oil-soluble acrylic ester polymer in which mixture at least one of the components (1) and (2) is modified by copolymerization of a polar monomer, such as a monoethylenically unsaturated acid, therewith. A preferred composition is obtained by copolymerization of such an acid with the mixture of the two components (1) and (2).

The relative proportions between the components (1) and (2), whether modified by a polar monomer or not, used in the addition polymerization are from 90:10 to 10:90 and preferably from 40:60 to 60:40 weight ratio. The amount of the mixture of components (1) and (2) used in the addition polymerization is from 5 to 20% (preferably 10 to 15%) by weight of the total of the mixture weight plus monomer weight.

The component (1) is a drying oil-modified alkyd or drying-oil modified polyester condensation product of at least one dicarboxylic acid selected from the group consisting of phthalic acid, isophthalic acid, terephthalic acid, tetrahydrophthalic acid and saturated dicarboxylic acids having 4 to 12 carbon atoms and anhydrides thereof, with an aliphatic polyol having 2 to 6 carbon atoms.

By the term "drying oil" it is intended to embrace semi-drying oils as well as those generally considered to be full drying oils. The modified alkyd or polyester may be made from the several components in conventional fashion. The proportion of oil may be from 35 or 40% to as high as 80% or more based on the entire weight of alkyd or polyester. The long oil alkyds having a 45 to 80% drying oil content are preferred. The molecular weight of the alkyd may be from 1,000 to 5,000 and is preferably about 2,500 to 4,000.

Alkyd resins of the type herein contemplated are produced by the interaction of at least three materials; namely, a dibasic acid, a polyhydric alcohol, and a drying oil or semi-drying oil fatty acid or alcoholized drying or semi-drying oil. Other modifying agents may be present in the reaction mass such as, for example, monocarboxylic acids, e.g., benzoic acid, crotonic acid, etc. The alkyds may also be modified with rosin or phenolic resins, or other well known materials. Two principal techniques have been developed for the preparation of the oil-modified alkyds, e.g., solvent method and fusion method. For the present purposes, the manner of producing the modified alkyd is relatively unimportant. Accordingly, where reference is made to a drying oil or semi-drying oil-modified alkyd herein, alkyds are contemplated whether produced by (a) the direct esterification reaction of semi-drying oil fatty acids with the dicarboxylic acid and the polyhydric alcohol or (b) the indirect esterification wherein a drying oil or semi-drying oil is first alcoholized with a polyhydric alcohol and thereafter esterified with a dibasic acid, under either of the principal techniques mentioned.

It is, of course, understood that multiple components may be present in the reaction mass, and instead of one drying or semi-drying oil, a mixture of drying or semi-drying oils and/or fatty acids, one or more dibasic acids, and one or more polyols may be used. The reaction may be carried out in the presence or absence of catalysts and in the presence or absence of solvents.

The unsaturated aliphatic drying oil or semi-drying oil acids are preferably those derived from naturally occurring oils of animal, vegetable or marine origin, particularly those derived from drying oils and semi-drying oils. These acids may be either non-conjugated or conjugated and may be employed as the monomer, dimer and/or trimer. Such preferred acids have a iodine value of from about 120 to about 425. Specific examples of unsaturated aliphatic acids useful in accordance herewith for the production of oil-modified alkyd resins are as follows:

TABLE I

| Fatty Acid | Empirical Formula | Natural Source |
| --- | --- | --- |
| Hiragonic | $C_{16}H_{26}O_2$ | Japanese Sardine Oil. |
| Linoleic | $C_{18}H_{32}O_2$ | Cottonseed Oil. Soyabean Oil. Poppy Seed. Linseed Oil. Peanut Oil. Corn Oil. Perilla. Sunflower Seed. Sesame. |
| Iso-linoleic | $C_{18}H_{32}O_2$ | Castor Oil (dehydrated). |
| Linolenic | $C_{18}H_{30}O_2$ | Castor Oil (dehydrated). Linseed. Perilla. Hempseed. |
| Elaeostearic | $C_{18}H_{30}O_2$ | Tung. |
| Punicic | $C_{18}H_{30}O_2$ | Pomegranate. |
| Paranaric | $C_{18}H_{28}O_2$ | Seed Fats. |
| Arachidonic | $C_{20}H_{32}O_2$ | Brain, liver, blood and depot fats. |
| Clupanodonic | $C_{22}H_{34}O_2$ | Marine animal oils, e.g., menhaden. |
| Scoliodenic | $C_{24}H_{38}O_2$ | Marine animal oils. |
| Nisinic | $C_{24}H_{36}O_2$ | Marine animal oils. |
| Tariric | $C_{18}H_{32}O_2$ | Seed Fat. |
| Licanic | $C_{18}H_{28}O_3$ | Oiticica oil. |
| Abietic | $C_{20}H_{30}O_2$ | Rosin. Tall Oil. |

Natural oils of the drying or semi-drying types, as exemplified above, are generally mixtures of glycerides of two or more of the acids named together with other glycerides, e.g., glyceryl oleate, glyceryl stearate and miscellaneous ingredients, e.g., phosphatides. Procedures for producing mixed acids of such oils are well known, e.g., "splitting" and such commercial acids are a preferred starting material. Thus there may be employed dehydrated castor oil fatty acids; linseed oil fatty acids, soyabean oil fatty acids, tung oil fatty acids, rosin acids, tall oil acids, etc., the individual purified and segregated acids contained therein, or the fatty acids named above and synthesized by known methods. Also as indicated such acids may be isomerized, or converted to the dimer or trimer prior to use herein. Polyethenoid acids of the conjugated, non-conjugated, or mixed conjugated, non-conjugated types may be used. In the preparation of coating composition vehicles, the drying oil fatty acids, and particularly the vegetable drying oil fatty acids are preferred.

Another of the essential components of the alkyd resins used in this invention is a polyhydric alcohol. These are aliphatic polyhydroxy compounds containing two or more hydroxy radicals. Those which may be used in accordance with this invention include for example, ethylene glycol, diethylene glycol, propylene glycol, glycerine, trimethylolethane, trimethylolpropane, pentaerythritol, polypentaerythritol, pinacol, arabitol, xylitol, sorbitol, mannitol, mixtures of these, etc.

Under certain circumstances it will be found desirable to use in conjunction with the polyol or mixture of polyols, a monohydric alcohol. Examples of such monohydric alcohols include hydroabietyl alcohol, soya fatty alcohols, etc.

The third essential component of the alkyds useful in this invention is a dibasic acid. Specific examples of dibasic acids and/or derivatives of polybasic acids useful alone or in admixture with another polybasic acid in accordance with this invention include the following: phthalic acid, phthalic anhydride, isophthalic acid, terephthalic acid (preferably in admixture with another dibasic acid), adipic acid, sebacic acid, tetrahydrophthalic anhydride, tetrachlorophthalic anhydride.

The most commonly used dibasic acid is, of course, phthalic anhydride, alone or in admixture with one or more of the others listed above.

In accordance with well known production techniques, the alkyds useful in accordance with this invention are preferably prepared having an oil content of from about 50% to about 80%. In general, acid values of the final alkyds are maintained at less than about 40 and preferably less than 20. The excess of hydroxyl groups over the available carboxylic acid groups as calculated in the admixing of the ingredients may range up to 50% over that theoretically required to react with the carboxyl content of the reaction mass. It may seem difficult of reconciliation that these materials have an acid number and at the same time an excess of hydroxyl. This may be explained by the fact that esterification occurs during heating of these reactants at elevated temperatures and if heating is carried on too far, gelation ensues. The product becomes solid and useless. Therefore, the "cook" is discontinued usually prior to complete reaction of all the carboxyl groups with available hydroxyl groups. Thus the product has an acid value; at the same time it contains what may amount to an excess of hydroxyl.

In the examples given later in the specification, reference will be had to certain oil-modified alkyds in terms of the ingredients inter-reacted to produce them. It will be understood that customary alkyd formation techniques are employed and that the products have oil lengths, acid values and hydroxyl contents within the ranges above specified.

TABLE II (1) 52% linseed oil, pentaerythritol, phthalate.
(2) 60% soyabean oil, pentaerythritol, phthalate.
(3) 52% soya-tung, glyceryl phthalate-phenolic modified.
(4) 39% linseed glyceryl phthalate alkyd.
(5) 45% oil (1:1 linseed-oiticica) glyceryl phthalate alkyd.
(6) 33% linseed glyceryl phthalate-rosin modified.
(7) 72% linseed pentaerythritol isophthalate.
(8) 80% linseed pentaerythritol isophthalate.
(9) 70% dehydrated castor pentaerythritol phthalate.
(10) 66% linseed pentaerythritol phthalate.

Table II which is continued below is not an exhaustive list of alkyds that may be used in the present invention, but gives typical alkyds that are suitable.

(11) 52% oil (4:1 soya-dehydrated castor) pentaerythritol phthalate.
(12) 52% linseed pentaerythritol phthalate-benzoate (7:1).
(13) 52% linseed pentaerythritol-trimethylolethane (1:1) phthalate.
(14) 52% linseed trimethylolethane phthalate.
(15) 75% linseed trimethylolethane terephthalate.
(16) 40% soya trimethylolethane phthlate-fumarate (19:1).
(17) 60% linoleic acid glyceryl phthalate.
(18) 70% linolenic acid glyceryl phthalate.

The percentages expressed above and in subsequent references to alkyd resins refer to the percentage of oil calculated as the glyceride in the final product at 100% solids. It does not matter whether the modification is by reaction of the oil fatty acid or the oil itself through alcoholysis; the designation will be the same.

Many other alkyds are known and may be used for this invention.

Component (2) may be any polymer or copolymer of an ester of acrylic acid or methacrylic acid containing sufficient hydrophobic hydrocarbon groups to make the polymer soluble in aliphatic hydrocarbons. Thus, there may be used copolymers of esters of methacrylic acid or acrylic acid formed with alcohols having 4 to 18 carbon atoms or of mixtures of such esters with esters of methacrylic acid or acrylic acid formed with alcohols having 1 to 3 carbon atoms, wherein sufficient hydrocarbon groups of at least four carbon atoms are present to impart solubility of the polymer in the solvent medium used in the polymerization system. Mixtures of methacrylate and acrylate esters can be used in the production of the solvent-soluble polymers. Such polymers may also include in the copolymer molecule substantial proportions from 1% to as much as 50% by weight (to an extent not inconsistent with the requirement of oil-solubility) of units derived from other monoethylenically unsaturated monomers such as maleic anhydride, acrylic acid, methacrylic acid, vinyl pyrrolidone, N-dimethylaminoethyl acrylate or methacrylate, N,N - dimethylaminoethyl -acrylamide or -methacrylamide, dimethylaminoethyl vinyl ether, dimethylaminoethyl vinyl sulfide, ureidoalkyl vinyl ether or sulfide such as the ureidoethyl vinyl ether or sulfide, vinyl chloride, vinylidene chloride, vinyl acetate, vinyl propionate, vinyl laurate, vinyl stearate, vinyl oleate, ethylene, isobutylene, acrylamide, methacrylamide, acrylonitrile, methacrylonitrile, vinyl ethyl ether, vinyl isobutyl ether.

One or both of the components (1) and (2) may be modified with a polar monomer of monoethylenically unsaturated type by mixing either of the components with the polar monomer and then subjecting the mixture to copolymerizing conditions. This results in grafting of the polar monomer on the component (1) or on component (2), whichever is used. Polar monomers that may be used include those having a group selected from the group consisting of carboxyl, hydroxyl (alcoholic), amine and amide groups. Examples are acrylic acid, methacrylic acid, itaconic acid or anhydride, maleic anhydride, methacryloxypropionic acid, acrylamide, methacrylamide, N-methylolacrylamide, N-methylolmethacrylamide, β-hydroxyethyl acrylate or methacrylate, β-hydroxypropyl acrylate or methacrylate, N-hydroxyethylacrylamide, dimethylaminoethyl acrylate or methacrylate, N-(dimethylaminoethyl)-methacrylamide or -acrylamide, vinylpyrrolidone, ureidoethyl vinyl ether or sulfide, or 4-vinylpyridine. The amount of polar monomer may be from 1 to 20% by weight, based on the weight of the component to be modified. In case of the oil-soluble acrylic polymer (component (2)) the polar monomer may be used as a component of the initial acrylic ester monomer mixture instead of being grafted on the oil-soluble polymer after its formation. If desired, a part of the polar monomer may be initially copolymerized to form the oil-soluble polymer and another portion may be grafted on the copolymer. A preferred system is obtained by graft copolymerization of a polar monomer, and especially an acid monomer, on a mixture of components (1) and (2), using 1 to 20% by weight of monomer on the total weight of the mixture. A free-radical initiator is used and the copolymerization may be effected at elevated temperatures, such as 45 to 150° C. for 1 to 5 hours.

The monomers that can be used to produce the dispersed (but undissolved) addition polymers of the present invention may be any monoethylenically unsaturated monomer which is used alone does not produce a polymer soluble in the hydrocarbon medium employed or if used with other monomers does not produce with the monomers used a copolymer soluble in such media. Preferred monomers include acrylonitrile and methacrylonitrile, acrylic acid, methacrylic acid, itaconic acid, and the esters of these acids, especially of acrylic or methacrylic acids, with saturated alcohols having 1 to 4 carbon atoms, vinyl esters of acids having 1 to 3 carbon atoms, acrylamide, methacrylamide, vinyl chloride, and vinylidene chloride. In general polymers and copolymers having any proportion of one or more of these several monomers produce polymers and copolymers which are adequately insoluble in the hydrocarbon solvent used.

Besides these monomers, a minor proportion (up to 45% by weight of the copolymer) of a vinyl aromatic compound such as styrene, vinyl toluene or vinyl naphthalene and similar proportions of higher saturated alcohol esters of acrylic acid or methacrylic acid or of higher aliphatic vinyl esters such as those of the acids having from 4 to 18 carbon atoms may be used. For example, esters of alcohols having from 5 to 18 carbon atoms with acrylic acid or methacrylic acid, or the higher fatty acid vinyl esters mentioned which tend to impart hydrocarbon solubility to copolymers produced therefrom may be used in conjunction with other monomers to the extent that the resulting copolymer does not become soluble in the particular hydrocarbon medium employed. Usually the content of vinylaromatic compound should not be over about 25% by weight and the content of higher alkyl acrylate or methacrylate esters should not be over about 30% by weight unless large proportions of other comonomers which counteract the solubilizing tendency of the higher esters or vinyl aromatic monomers are included, examples being acrylonitrile, vinyl chloride and methacrylic acid. The monomer mixture to be polymerized may also contain small proportions such as 0.5 to 10% by weight of maleic anhydride, isocyanatoethyl acrylate, N-methylolacrylamide or N-methylolmethacrylamide.

The polymerization is effected in a hydrocarbon medium consisting essentially of liquid aliphatic hydrocarbons. A pure aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials such as aromatic or naphthenic hydrocarbons and in certain instances the amount of such nonaliphatic component may attain as high as 49% by weight of the entire liquid medium. However, the liquid medium preferably consists essentially of aliphatic hydrocarbons and in general the compositions of the present invention contain less than 25% by weight based on the weight of the liquid medium of an aromatic hydrocarbon and often none at all.

It is essential that the hydrocarbon be of liquid character, but it may have a wide boiling range from a minimum of about −50° C. (in which case high pressures may be needed in the polymerization) to a maximum which may be as high at 520° C. For most purposes, the boiling point should be from about 75° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35° C. may be preferred. A similar boiling point range may be selected for pressure systems, as in aerosol sprays. On the other hand, where the coating and impragnating operation is to be carried out in equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

The term "consisting essentially of" as used in the definition of the ingredients present in the liquid medium claimed is intended to exclude the presence of other materials in such amounts as to interfere substantially with the properties and characteristics possessed by the composition set forth but to permit the presence of other materials in such amounts as not substantially to affect said properties and characteristics adversely.

The mixture of oil-modified alkyd and oil-soluble acrylic ester polymer (components (1) and (2)) or of their polar monomer-modified versions is dissolved in the hydrocarbon medium in a concentration of at least 1%, generally from 5 to 40% or more, preferably about 10 to 20% by weight. The entire amount of the hydrocarbon solvent that is to be present in the final composition may be used at the start, but generally it is preferred to use only a portion such as ½ to ¾ thereof and to dilute part of the monomer with the remaining portion. A free-radical initiator for the polymerization may be added to the solution of the alkyd and acrylic polymer in the hydrocarbon solvent or it may be added with the monomer or monomers. The alkyd/acrylic polymer mixture in the solution may be allowed to react with the initiator by allowing the mixture to stand at a temperature from room temperature to 125° C. for a period of several minutes to an hour or so before introducing the monomers. This apparently activates either or both of the alkyd and the acrylic polymer and causes one or both of them to react more extensively with the monomers. However, this activation step is not essential. The amount of initiator may be from 0.001% to 10% by weight based on the monomers, but it is preferably about 0.1 to 1% by weight on monomers. Any of the conventional free-radical initiators may be used provided they have appreciable solubility either in the hydrocarbon medium or in the monomers. Examples include the peroxides such as benzoyl peroxide, lauroyl peroxide, hydroperoxides such as tert-butyl hydroperoxide, cumene hydroperoxide, and azo catalysts such as azodiisobutyronitrile.

The monomers may be added all at once to the alkyd/acrylic polymer solution or any portion thereof may be initially added and the remainder added gradually over a period of 1 to 5 hours or so. Depending upon the particular monomers, the particular initiator and the amount thereof, the polymerization may be allowed to proceed at room temperature in which case the heat that develops may be removed or not as desired. However, heating and/or cooling of the polymerization medium may be employed so as to provide for effecting the reaction at any controlled temperature from room temperature up to about 125° C. Generally with the peroxides as initiators the preferred temperature is in the range of about 70° to 100° C. whereas with the azo catalysts the preferred range is about 75° to 80° C.

As in conventional polymerization procedures, a so-called "chaser" solution of the initiator in the solvent may be added at the end of the reaction and allowed to cause additional polymerization during a period of 1 to 5 hours or so. Variations in the order of addition of monomers may be employed. In general the monomers may be mixed in the desired proportions before their addition to the polymerization medium comprising the solution of alkyd and acrylic polymer. However, it may be desirable to add one of the monomers first and then add a second or other monomers later. For example, a sluggish monomer such as vinylidene chloride may be added first, followed by a faster monomer such as ethyl acrylate. Similarly butyl acrylate may be followed by acrylonitrile. The addition of different monomers in succession may be resorted to for other reasons than merely to adjust for the different reactivity rates. It may be desired to polymerize one or more monomers initially and follow this with subsequent addition of one or more other monomers so that in effect a graft operation is obtained.

The proportions of total monomer used are in the range of 80% to 95% by weight, based on the total weight of the monomer (or monomers) and the mixture of polyester and oil-soluble acrylic polymer.

Essentially the product is a dispersion (milky in appearance) of a mixture of polymers comprising in major proportion an addition polymer of the monoethylenically unsaturated monomer or monomers in the form of undissolved particles of about 0.1 to 2 microns in size. Generally, the average particle size of such undissolved polymer particles is from 0.2 to 0.5 micron. The dispersion is stable to mechanical forces such as centrifugation. It is presumed that the stability results from the fact that the mixture of polyester and oil-soluble acrylic polymer initially present or a copolymer of one or both components of such mixture with a portion of the monomers provides an effective dispersing agent in the medium. The viscosity of the product at room temperature and 40% concentration in the hydrocarbon solvent in which it is produced ranges from 0.3 to 10 poises. In the preferred systems the viscosity is in the neighborhood of about 1.0 to 4.2 poises at 50% concentration and room temperature. The minimum film-forming temperature of the composition varies from about −40° C. to 150° C. depending upon the particular monomers and the particular components of the alkyd/acrylic polymer mixture used.

It is believed that the product comprises a mixture of polymers which may include the alkyd and the oil-soluble acrylic polymer as initially introduced into the copolymerization medium or the polar monomer-modified copolymers of one or both such components (1) and (2), but also polymers of the monomers with themselves and/or with each other and copolymers of the monomer or monomers with a portion of one or the other or of both components (1) and (2) of the alkyd/acrylic mixture or modified alkyd-acrylic copolymer initially introduced. Such products are extremely difficult to analyze and the proportions of unchanged alkyd, unchanged oil-soluble acrylic polymer or of unchanged copolymer (polar modified or not) of the alkyd and oil-soluble acrylic polymer, simple polymers or copolymers of the monomers, and copolymers of the alkyd and/or oil-soluble acrylic polymer with one or more monomers depends upon the particular alkyd, the particular oil-soluble acrylic polymer, the extent of activation by catalyst before introduction of the monomers, and the particular monomers and conditions of polymerization.

In many cases, as much as 50% of the initially introduced alkyd/polyacrylate mixture or copolymer remains as a component of the final composition. In other instances as little as 10% or as high as 90% of the alkyd/polyacrylate mixture or copolymer remains unchanged. However, the composition obtained is not the mere equivalent of a composition obtained by simply mixing the alkyd/polyacrylate mixture or copolymer initially used with a separately formed polymer or copolymer of the monomer or monomers used.

The stability of the dispersion depends apparently upon the formation in situ, during polymerization of the monomer or monomers in the presence of the polyester and oil-soluble polyacrylate or of the copolymer thereof, of an appreciable polymeric component which serves as a dispersing agent in the composition. Such dispersing agent may be dissolved in the hydrocarbon medium partly or wholly or it may be partly or entirely absorbed on the surface of the individual polymer particles held in suspension in the medium. The stability is improved by grafting of a polar monomer on one or the other of the components of the mixture of alkyd and oil-soluble acrylic polymer. Outstanding stability results from the use of the product obtained by grafting an acid monomer on a mixture of the alkyd and oil-soluble polyacrylate.

Not only do the essentially non-aqueous or anhydrous polymer dispersions of the present invention have improved stability but they are characterized by outstanding receptivity to pigments and ability to produce coatings having excellent high gloss. These characteristics depend on the use of both an alkyd as defined and an oil-soluble acrylic ester, the optimum qualities being obtained in the case wherein the polymerization medium for the monomer or monomers contains a graft copolymer of a polar monomer, and especially of an acid monomer, on a mixture of the alkyd and the oil soluble polyacrylate.

As compared to compositions containing a polyvinyl ether or a natural or synthetic rubber such as of the butadiene or isoprene types, the compositions of the present invention have the advantage that they have little or no tendency to color on overbaking or to discolor or become embrittled in the coated or impregnated articles as a result of oxidation or exposure to ultraviolet light during weathering. In addition, anhydrous polymer dispersion systems based on oxidatively degraded rubbers as dispersing agent precursors require extremely careful control of the extent of oxidation. The present invention requires no such special step for the production of products having reproducible viscosity and improved coating characteristics such as adhesion and freedom from discoloration.

The polymer dispersions of the present invention may have concentrations varying from 1 to 55% or higher solids content. The compositions are dilutable to any desired concentration for application for the coating and impregnation of various substrates as well as for the formation of free films by casting techniques.

The anhydrous dispersions of the present invention may be pigmented. The weight ratio of pigment to binder may be from 75:25 to 1:99 considering the entire solids content of the dispersions (before pigmentation) as the binder weight.

The polymer dispersions (clear or pigmented) may be employed for the impregnation and coating of textile fabrics, paper, paperboards, leathers, wood, metals, ceramics, concrete, bricks, stones, plaster, vinyl wall tile and flooring tile, linoleum, alsphalt tile, and asbestos cement products including siding and shingles.

The viscosity of the dispersion is easily controlled such as by the addition of an aliphatic hydrocarbon solvent which simply dilutes the dispersion or by the addition of a swelling agent for the polymer or by the addition of hydrocarbon-soluble polymers, natural gums and resins, or lyophilic clays, such as the fatty amine quaternary salt-modified bentonites or montmorillonites and fatty acid-modified silicates.

The polymer dispersions of the present invention are adapted to be modified by the incorporation of drying oils, pigments, fillers, dyes, as well as plasticizers and polymeric or resinous materials which are soluble in the hydrocarbon liquid vehicle including fatty-acid modified shellac, gums, natural resins, waxes, asphalt, bitumen, coal tar, cumaroneindene resins, epoxidized fatty oils, epoxy resins, organic solvent-soluble alkylated methylolated aminoplast resins including the condensates of formaldehyde with urea, melamine, thiourea, benzoguanamine, ethyleneurea, alkylated with an alcohol having 2 to 6 carbon atoms such as n-butanol. Among other materials that can be incorporated are the alkyds, organic solvent-soluble vinyl and acrylic resins with or without plasticizers including plastisols obtained from polyvinyl chloride or copolymers of vinyl chloride and plasticizers therefor.

In the following examples which are illustrative of the invention, the parts and percentages are by weight unless otherwise noted.

*Example I*

To a solution of 30 parts of a 60% soyabean oil-modified alkyd (mol. wt. ca. 2200) formed of 360 parts soyabean oil, 80 parts of glycerol, 80 parts phthalic anhydride and 109 parts of sebacic acid and 30 parts of polyisobutylmethacrylate (M.W. 100,000 viscosity average) in 600 parts of solvent naphtha (boiling range 243-293° F.) in a suitable reaction vessel equipped with an agitator, reflux condenser, gas inlet and temperature control devices were added 3 parts of glacial acrylic acid and 0.2 part of lauroyl peroxide. Then nitrogen gas was passed through the vessel until the oxygen content of the exit gas dropped to 0.1 percent. The agitator was started and the mixture heated to 85° C. under a slow stream of nitrogen for 2 hours.

The temperature was then raised to 90° C. and a mixture of 108 parts ethyl acrylate, 108 parts of methyl methacrylate, 0.3 part benzoyl peroxide and 0.2 part lauroyl peroxide were added all at once. Heating was continued with stirring until the temperature had again reached 90° C. Then a mixture of 160 parts ethyl acrylate, 161 parts methyl methacrylate, 0.5 part benzoyl peroxide, 0.3 part lauroyl peroxide and 275 parts of the same solvent naphtha was added gradually and uniformly over a period of 3 hours to the agitated material in the reaction vessel at 90° C. Finally a solution of 1.2 parts lauroyl peroxide in 25 parts of the same solvent naphtha was added gradually and uniformly over an additional 3 hours and the dispersion which was formed was heated, with stirring at 90° C. for an additional 1 hour before cooling to room temperature. The dispersion had a polymer solids content of 39.7 percent and could be readily spray or brush coated onto aluminum or steel. After a 30 minute bake at 300° C. the films were clear, glossy and displayed excellent adhesion to the substrate.

*Example II*

A solution of 18 parts of 45% oil-modified alkyd (mol. wt. ca. 2500) formed of 135 parts linseed oil, 135 parts oiticia oil, 97 parts glycerol, and 233 parts phthalic anhydride and 42 parts of a copolymer (M.W. 150,000) of 76% isobutyl methacrylate, 2% styrene, 2% maleic anhydride, and 20% lauryl methacrylate in a mixture of 80 parts of xylene and 520 parts of mineral spirits (boiling range 313–380° F.) was placed in a glass reaction vessel equipped with an agitator, reflux condenser, gas inlet, and a temperature control system. Then nitrogen gas was passed through the vessel until the oxygen content of the exit gas dropped to 0.1 percent. The agitator was started and the mixture heated to 95° C. while subjecting the mixture to a slow stream of nitrogen.

Then a mixture of 43 parts n-butyl methacrylate, 86 parts ethyl acrylate, 86 parts methyl methacrylate and 0.4 part of benzoyl peroxide was added all at once. Heating was continued until the temperature again reached 95° C. Then a mixture of 65 parts n-butyl methacrylate, 130 parts ethyl acrylate, 130 parts methyl methacrylate, 0.7 part benzoyl peroxide, 15 parts xylene and 260 parts mineral spirits (same as above) was added gradually and uniformly over a period of 4 hours to the agitated material in the reaction vessel at 95° C. Finally, a solution of 0.7 part benzoyl peroxide in 25 parts of xylene was added gradually and uniformly over an additional 3 hours and the dispersion which was formed was heated with agitation at 95° C. for an additional 1.5 hours when vacuum was applied gradually and solvent removed until the solids content had reached 50.0 percent before cooling to room temperature The dispersion was milky white and had a viscosity of 115 centipoise. The particle size was 0.4 micron (weight average radius). Films brushed onto wood were remarkably adherent and had a satin-like finish.

*Example III*

A solution of 6 parts of a 33% linseed oil-modified alkyd (mol. wt. ca. 3000) formed of 160 parts linseed oil, 110 parts glycerol, 180 parts phthalic anhydride, and 55 parts rosin and 54 parts of a copolymer (M.W. 110,000) of 84% isobutyl methacrylate, 15% of octyl methacrylate, and 1% methacrylic acid in 600 parts of solvent naphtha (boiling range 243-293° F.) was placed in a glass reaction vessel equipped with an agitator, reflux condenser, gas inlet, and a temperature control system. Then nitrogen gas was passed through the vessel until the oxygen content of the exit gas dropped to 0.1 percent. The agitator was started and the mixture heated to 75° C. while subjecting the mixture to a slow stream of nitrogen.

Then a mixture of 216 parts of methyl acrylate and 0.16 part of azodiisobutyronitrile were added all at once. Heating was continued with agitation until the temperature again reached 75° C. Then a mixture of 324 parts of methyl acrylate, 0.56 part of azodiisobutyronitrile and 300 parts of the same solvent naptha was added gradually and uniformly over a period of 3 hours to the agitated material in the reaction vessel at 75° C. The dispersion which was formed was heated with agitation at 80–85° C. for an additional 5 hours when vacuum was applied gradually and solvent removed until the solids content had reached 55.0 percent before cooling to room temperature. The milky white dispersion had a viscosity of 235 cps. The particle size ranged from 0.1–0.7 micron. Films made by air drying the dispersion on glass were extremely flexible, tough and extensible in addition to being crystal clear and extremely glossy.

*Example IV*

To a solution of 6 parts of a 70% soyabean oil-modified alkyd (mol. wt. ca. 2000) formed of 380 parts of soyabean oil, 80 parts of glycerol, and 218 parts sebacic acid and 54 parts of polyisobutylmethacrylate (M.W. 100,000 viscosity average) in 600 parts of solvent naphtha (boiling range 243–293° F.) in a suitable reaction vessel equipped with an agitator, reflux condenser, gas inlet and temperature control devices were added 6 parts of 2-hydroxyethyl methacrylate and 0.2 part of lauroyl peroxide. Then nitrogen gas was passed through the vessel until the oxygen content of the exit gas dropped to 0.1 percent. The agitator was started and the mixture heated to 90° C. under a slow stream of nitrogen for 2 hours.

Then a mixture of 86.5 parts acrylonitrile, 128 parts ethyl acrylate, 0.3 part benzoyl peroxide and 0.2 part lauroyl peroxide were added all at once. Heating was continued with stirring until the temperature had again reached 90° C. Then a mixture of 127.5 parts acrylonitrile, 192 parts of ethyl acrylate, 0.5 part benzoyl peroxide, 0.4 part lauroyl peroxide, 215 parts of the same solvent naphtha and 60 parts xylene were added gradually and uniformly over a period of 3 hours to the agitated material in the reaction vessel at 90° C. Finally a solution of 1.2 parts lauroyl peroxide in 25 parts of the same solvent naphtha was added gradually and uniformly over an additional 3 hours and the dispersion which was formed was heated, with stirring at 90° C. for an additional 1.5 hours when vacuum was applied gradually and solvent removed until the solids content had reached 50.6 percent before cooling to room temperature. Films cast from the bluish-white dispersion turned somewhat yellow on baking but had very good resistance to alcohol, gasoline and water.

*Example V*

To a solution of 30 parts of a 72% linseed oil-modified alkyd (mol. wt. ca. 2600) formed of 360 parts linseed oil, 21.5 parts glycerol, 52.5 parts phthalic anhydride and 66 parts azelaic acid and 30 parts of a copolymer (M.W. 165,000) of 67% isobutyl methacrylate and 33% of 1:1 mixture of decyl:octyl methacrylate in 600 parts of aliphatic solvent naphtha (boiling 244–291° F.) having a Kauri-Butanol value of 40.0 cc. in a suitable reaction vessel equipped with an agitator, reflux condenser, gas inlet and temperature control devices were added 6 parts of N-vinyl pyrrolidinone and 0.05 part of azodiisobutyronitrile. Then nitrogen gas was passed through the vessel until the oxygen content of the exit gas dropped to 0.1 percent. The agitator was started and the mixture heated to 80° C. under a slow stream of nitrogen for 2.5 hours. The temperature was then raised to 100° C. and a mixture of 43 parts styrene, 86 parts ethyl acrylate, 86 parts methyl methacrylate and 0.6 part of benzoyl peroxide were added all at once. Heating was continued with stirring until the temperature had again reached 100° C. Then a mixture of 130 parts ethyl acrylate, 65 parts styrene, 130 parts methyl methacrylate, 1.0 part benzoyl peroxide, 95 parts xylene and 180 parts of the same aliphatic naphtha was added gradually and uniformly over a period of 3 hours to the agitated material in the reaction vessel at 100° C. Finally a solution of 1.0 part of benzoyl peroxide in 25 parts of xylene was added gradually and uniformly over an additional 3 hours and the dispersion which was formed was heated, with stirring at 100° C. for an additional 2 hours when vacuum was applied gradually and solvent removed until the solids content had reached 51.5 percent before cooling to room temperature. The milky bluish white dispersion was brushed onto oak, maple and mahogany panels to give crystal clear films with deep gloss and clarity.

*Example VI*

Into a polymerization vessel equipped with agitator, reflux condenser, gas inlet and temperature control devices were charged:

30 parts of a 60% soyabean oil-modified alkyd (mol. wt. ca. 2300) formed of 360 parts soyabean oil, 80 parts glycerol, and 160 parts phthalic anhydride
30 parts of polyisobutyl methacrylate (M.W. 100,000)
3 parts glacial acrylic acid
179 parts methyl methacrylate
358 parts ethyl acrylate
2.4 parts benzoyl peroxide
600 parts solvent naphtha (boiling 243–293° F.)

The vessel was sparged with nitrogen, the stirrer started and the contents heated to 90° C. The polymerization started immediately and the heat was removed. Over the course of 45 minutes the temperature rose to 113° C. Occasional cooling was applied to maintain little or no refluxing. The conversion of monomer to polymer at the end of this time was 96.1 percent. Films cast from this dispersion remained flexible at 0° C. and lower.

*Example VII*

Into a polymerization vessel equipped with agitator, reflux condenser, gas inlet and temperature control devices were charged:

15 parts of oil-modified alkyd (mol. wt. ca. 2500) formed of 288 parts soyabean oil, 72 parts dehydrated castor oil, 88 parts pentaerythritol and 160 parts of phthalic anhydride
45 parts of a copolymer (M.W. 108,000) of:
2-ethylhexyl acrylate, 35% isobutyl methacrylate, 62% N,N-dimethyl acrylamide, 3%
162 parts vinylidene chloride
398 parts ethyl acrylate
1.0 part of azodiisobutyronitrile
900 parts of aliphatic hydrocarbon solvent, (boiling 207–218° F.)

The vessel was sparged with nitrogen, the stirrer started and the contents heated at 80° C. for 15 hours. At the end of this time vacuum was applied gradually and solvent removed until the solids content had increased to 48.7 percent. The milky off-white dispersion gave clear flexible films when applied to paper or cardboard.

*Example VIII*

To a solution of 20 parts of a 60% soyabean oil-modified alkyd (mol. wt. ca. 2200) formed of 360 parts soyabean oil, 80 parts of glycerol, 80 parts phthalic anhydride and 109 parts of sebacic acid and 40 parts of polyisobutylmethacrylate (M.W. 100,000 viscosity average) in 600 parts of solvent naphtha (boiling range 243–293° F.) in a suitable reaction vessel equipped with an agitator, reflux condenser, gas inlet and temperature control devices were added 6 parts of dimethylaminoethyl methacrylate and 0.05 part azodiisobutyronitrile. Then nitrogen gas was passed through the vessel until the oxygen content of the exit gas dropped to 0.1 percent. The agitator was started and the mixture heated to 85° C. under a slow stream of nitrogen for 2 hours.

The temperature was then raised to 90° C. and a mixture of 43 parts vinyl toluene, 43 parts methyl methacrylate, 129 parts ethyl acrylate, and 0.4 part benzoyl peroxide were added all at once. Heating was continued with stirring until the temperature had again reached 90° C. Then a mixture of 195 parts ethyl acrylate, 65 parts vinyl toluene, 65 parts methyl methacrylate, 0.7 part benzoyl peroxide, 275 parts of the same naphtha was added gradually and uniformly over a period of 3 hours to the agitated material in the reaction vessel at 90° C. Finally a solution of 1.2 parts lauroyl peroxide in 25 parts of the same solvent naphtha was added gradually and uniformly over an additional 3 hours and the dispersion which was formed was heated, with stirring at 90 C. for an additional 1.5 hours when vacuum was applied gradually and solvent removed until the solids content had reached 50.2 percent before cooling to room temperature. The resulting dispersion was milky white and had a viscosity of 150 centipoises. The particle size range was 0.1 to 0.9 micron. Films brushed on wood were very glossy and dried to the touch in about 30–40 minutes.

We claim:

1. A process for producing an addition polymer composition which comprises dissolving, at a concentration of at least 1% in a liquid, essentially aliphatic hydrocarbon medium boiling in the range of 75° C. to 520° C., a mixture in 90:10 to 10:90 weight ratio of
   (1) a drying oil-modified polyester condensation product of a dicarboxylic acid selected from the group consisting of saturated aliphatic dicarboxylic acids having 4 to 12 carbon atoms, phthalic acid, isophthalic acid, and terephthalic acid with an aliphatic polyhydric alcohol having 2 to 6 carbon atoms and 2 to 6 hydroxyl groups and
   (2) a polymer, soluble in the hydrocarbon medium, of at least one ester of an acid of the formula $$H_2C=C-(CH_2)_{n-1}H$$
$$|$$
$$COOH$$

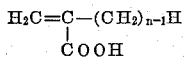

in which $n$ is an integer having a value of 1 to 2, with an alcohol having 4 to 18 carbon atoms and introducing into the solution of said mixture a free-radical initiator and monoethylenically unsaturated monomer molecules having a group of the formula $H_2C=C<$ at a temperature in the range of room temperature to about 125° C. to effect polymerization and to produce polymer particles stably dispersed in the medium which are undissolved in the medium and have sizes ranging from about 0.1 to 2 microns, the weight ratio of said mixture to monomer molecules being from 5:95 to 20:80, the proportion of initiator being from 0.001 to 10% of the weight of the monomer, and the monomer molecules being preselected to produce, under the aforesaid conditions of polymerization, a polymeric product dispersed in the hydrocarbon medium but insoluble therein.

2. An essentially anhydrous composition obtained by the process of claim 1.

3. A process as defined in claim 1 in which the polymer (2) is a product of addition polymerization of a monoethylenically unsaturated compound having a group of the formula $H_2C=C<$ and a polar group selected from the group consisting of carboxyl, alcoholic hydroxyl, amine, and amide groups in a medium containing a drying oil modified polyester condensation product of a dicarboxylic acid selected from the group consisting of saturated aliphatic dicarboxylic acids having 4 to 12 carbon atoms, phthalic acid, isophthalic acid, and terephthalic acid with an aliphatic polyhydric alcohol having 2 to 6 carbon atoms and 2 to 6 hydroxyl groups.

4. A process as defined in claim 1 in which the polymer (2) is a copolymer containing copolymerized units of a monoethylenically unsaturated monomer having a group of the formula $H_2C=C<$ and containing a polar group selected from the group consisting of carboxyl, alcoholic hydroxyl, amine and amide.

5. A process for producing an addition polymer composition which comprises dissolving at a concentration of at leaest 1% in a liquid, essentially aliphatic hydrocarbon medium boiling in the range of 75° C. to 520° C. a mixture in 90:10 to 10:90 weight ratio of
   (1) a drying oil-modified polyester condensation product of a dicarboxylic acid selected from the group consisting of saturated aliphatic dicarboxylic acids having 4 to 12 carbon atoms, phthalic acid, isophthalic acid, and terephthalic acid with an aliphatic polyhydric alcohol having 2 to 6 carbon atoms and 2 to 6 hydroxyl groups and
   (2) a polymer, soluble in the hydrocarbon medium, of at least one ester of an acid of the formula $$H_2C=C-(CH_2)_{n-1}H$$
$$|$$
$$COOH$$

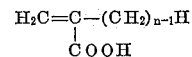

in which $n$ is an integer having a value of 1 to 2, with an alcohol having 4 to 18 carbon atoms and introducing into the solution of said mixture at least one monoethylenically unsaturated monomer selected from the group consisting of acrylic acid, methacrylic acid, itaconic acid, acrylamide, methacrylamide, acrylonitrile, methacrylonitrile, $(C_1-C_4)$-alkyl esters of acrylic acid, $(C_1-C_4)$-alkyl esters of methacrylic acid, vinyl formate, vinyl acetate, vinyl propionate, vinyl chloride, and vinylidene chloride and a free-radical initiator at a temperature in the range of room temperature to about 125° C. to effect polymerization and to produce polymer particles stably dispersed in the medium which are undissolved in the medium and have sizes ranging from about 0.1 to 2 microns, the weight ratio of said mixture to monomer molecules being from 5:95 to 20:80, and the proportion of initiator being from 0.001 to 10% of the weight of the monomer.

6. An essentially anhydrous composition obtained by the process of claim 5.

7. A process as defined in claim 5 in which there is also introduced into the solution of said mixture at least one monomer selected from the group consisting of (a) styrene, vinyl-toluene, vinyl esters of fatty acids having 4 to 18 carbon atoms, esters of acrylic acid with an alcohol having 5 to 18 carbon atoms, and esters of methacrylic acid with an alcohol having 5 to 18 carbon atoms, and (b) N-methylolacrylamide, N-methylolmethacrylamide, and maleic anhydride, the amount of (a) when present not exceeding about 45% by weight of the total monomer weight, and the amount of (b) when present not exceeding about 10% by weight of the total monomer weight.

8. An essentially anhydrous composition obtained by the process of claim 7.

9. A process for producing an addition polymer composition which comprises dissolving at a concentration of at least 1% in a liquid, essentially aliphatic hydrocarbon medium boiling in the range of 75° C. to 520° C. a graft copolymer of (a) a monoethylenically unsaturated monomer having a group of the formula $H_2C=C<$ and containing a polar group selected from the group consisting of carboxyl, alcoholic hydroxyl, amine, and amide groups on (b) a mixture of
   (1) a drying oil-modified polyester condensation product of a dicarboxylic acid selected from the group consisting of saturated aliphatic dicarboxylic acids having 4 to 12 carbon atoms, phthalic acid, isophthalic acid, and terephthalic acid with an aliphatic polyhydric alcohol having 2 to 6 carbon atoms and 2 to 6 hydroxyl groups and
   (2) a polymer, soluble in the hydrocarbon medium, of at least one ester of an acid of the formula $$H_2C=C-(CH_2)_{n-1}H$$
$$|$$
$$COOH$$

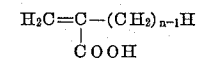

wherein $n$ is an integer having a value of 1 to 2, with an alcohol having 4 to 18 carbon atoms, and introducing into the solution at least one monoethylenically unsaturated monomer selected from the group consisting of acrylic acid, methacrylic acid, itaconic acid, acrylamide, methacrylamide, acrylonitrile, methacrylonitrile, ($C_1$–$C_4$)-alkyl esters of acrylic acid, ($C_1$–$C_4$)-alkyl esters of methacrylic acid, vinyl formate, vinyl acetate, vinyl propionate, vinyl chloride, and vinylidene chloride and a free-radical initiator at a temperature in the range of room temperature to about 125° C. to effect polymerization and to produce polymer particles stably dispersed in the medium which are undissolved in the medium and have sizes ranging from about 0.1 to 2 microns, the weight ratio of said graft copolymer to monomer being from 5:95 to 20:80, and the proportion of initiator being from 0.001 to 10% of the weight of the monomer.

10. A process for producing an addition polymer composition which comprises dissolving at a concentration of at least 1% in a liquid, essentially aliphatic hydrocarbon medium boiling in the range of 75° C. to 520° C. a graft copolymer of an acid of the formula

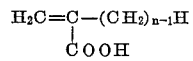

in which $n$ is an integer having a value of 1 to 2, on a mixture of
(1) a drying oil-modified polyester condensation product of a dicarboxylic acid selected from the group consisting of saturated aliphatic dicarboxylic acids having 4 to 12 carbon atoms, phthalic acid, isophthalic acid, terephthalic acid with an aliphatic polyhydric alcohol having 2 to 6 carbon atoms and 2 to 6 hydroxyl groups and
(2) a polymer, soluble in the hydrocarbon medium, of at least one ester of an acid of the formula

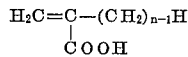

wherein $n$ is an integer having a value of 1 to 2, with an alcohol having 4 to 18 carbon atoms, and introducing into the solution at least one monoethylenically unsaturated monomer selected from the group consisting of acrylic acid, methacrylic acid, itaconic acid, acrylamide, methacrylamide, acrylonitrile, methacrylonitrile, ($C_1$–$C_4$)-alkyl esters of acrylic acid, ($C_1$–$C_4$)-alkyl esters of methacrylic acid, vinyl formate, vinyl acetate, vinyl propionate, vinyl chloride and vinylidene chloride and a free-radical initiator at a temperature in the range of room temperature to about 125° C. to effect polymerization and to produce polymer particles stably dispersed in the medium which are undissolved in the medium and have sizes ranging from about 0.1 to 2 microns, the weight ratio of said graft copolymer to monomer being from 5:95 to 20:80, and the proportion of initiator being from 0.001 to 10% of the weight of the monomer.

References Cited by the Examiner

UNITED STATES PATENTS

| | | | |
|---|---|---|---|
| 2,117,321 | 5/1938 | Hill | 260—86.1 |
| 2,600,623 | 6/1952 | Daniel et al. | 260—22 |
| 2,647,092 | 7/1953 | Meeske et al. | 260—22 |
| 2,727,870 | 12/1955 | Beavers et al. | 260—22 |
| 2,865,874 | 12/1958 | Christenson et al. | 260—33.6 |
| 2,957,837 | 10/1960 | Smith et al. | 260—22 |

FOREIGN PATENTS

| | | |
|---|---|---|
| 587,518 | 11/1959 | Canada. |
| 541,423 | 5/1957 | Canada. |

LEON J. BERCOVITZ, *Primary Examiner.*

DONALD E. CZAJA, *Examiner.*

R. W. GRIFFIN, *Assistant Examiner.*